(12) United States Patent
Holzhueter et al.

(10) Patent No.: US 9,119,472 B2
(45) Date of Patent: Sep. 1, 2015

(54) MOVABLE SEAT INSERT

(71) Applicants: Walter W Holzhueter, Southgate, MI (US); Travis D Bechtel, Goodrich, MI (US)

(72) Inventors: Walter W Holzhueter, Southgate, MI (US); Travis D Bechtel, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 328 days.

(21) Appl. No.: 13/740,361

(22) Filed: Jan. 14, 2013

(65) Prior Publication Data
US 2014/0077546 A1 Mar. 20, 2014

Related U.S. Application Data

(60) Provisional application No. 61/700,925, filed on Sep. 14, 2012.

(51) Int. Cl.
| A47C 3/00 | (2006.01) |
| A47C 7/14 | (2006.01) |
| B60N 2/44 | (2006.01) |
| G06K 9/62 | (2006.01) |
| B60N 2/02 | (2006.01) |
| B60N 2/18 | (2006.01) |

(52) U.S. Cl.
CPC ... *A47C 7/14* (2013.01); *B60N 2/02* (2013.01); *B60N 2/1803* (2013.01); *B60N 2/1835* (2013.01); *B60N 2/1864* (2013.01); *B60N 2/442* (2013.01); *G06K 9/6267* (2013.01); *B60N 2002/0236* (2013.01)

(58) Field of Classification Search
CPC ...................................................... A47C 7/405
USPC ............................... 297/284.1, 284.3, 284.11
See application file for complete search history.

(56) References Cited

U.S. PATENT DOCUMENTS

| 4,558,903 | A | * | 12/1985 | Takagi .......................... 297/408 |
| 5,320,409 | A | * | 6/1994 | Katoh et al. ................ 297/284.6 |
| 6,499,803 | B2 | * | 12/2002 | Nakane et al. ............. 297/284.4 |
| 7,322,652 | B1 | | 1/2008 | Tache |
| 7,850,247 | B2 | | 12/2010 | Stauske et al. |
| 7,909,403 | B2 | | 3/2011 | Lawall et al. |
| 8,128,147 | B1 | | 3/2012 | Kanda et al. |
| 8,128,167 | B2 | | 3/2012 | Zhong et al. |
| 2007/0152483 | A1 | * | 7/2007 | Fujita et al. ................ 297/284.1 |
| 2007/0222270 | A1 | | 9/2007 | Combest |
| 2010/0289302 | A1 | * | 11/2010 | Cheng ...................... 297/180.12 |

* cited by examiner

*Primary Examiner* — Matthew Ing
(74) *Attorney, Agent, or Firm* — Ralph E Smith

(57) ABSTRACT

A seat assembly may include a seatback, a seat bottom and an adjustment mechanism. The seat bottom may include an aft portion adjacent to the seatback, a front portion opposite the aft portion, and a central portion disposed between the front and aft ends. The adjustment mechanism may support the central portion for movement relative to the front portion between first and second positions.

20 Claims, 3 Drawing Sheets

MOVABLE SEAT INSERT

CROSS-REFERENCE TO RELATED APPLICATIONS

This application claims the benefit of U.S. Provisional Application No. 61/700,925, filed on Sep. 14, 2012. The entire disclosure of the above application is incorporated herein by reference.

FIELD

The present disclosure relates to a movable seat insert.

BACKGROUND

Modern vehicles typically include seat assemblies that are adjustable to facilitate occupant comfort. Such seat assemblies may be configured to allow the occupant to select a position of the seat assembly that improves the occupant's comfort and/or posture. For example, a particular position of the seat assembly may be chosen based on the occupant's personal preferences, size, body shape and/or whether the occupant will be driving or performing some other activity while sitting in the seat assembly.

SUMMARY

In one form, the present disclosure provides a seat assembly that may include a seatback, a seat bottom and an adjustment mechanism. The seat bottom may include an aft portion adjacent to the seatback, a front portion opposite the aft portion, and a central portion disposed between the front and aft ends. The adjustment mechanism may support the central portion for movement relative to the front portion between first and second positions.

In some embodiments, the central portion may be movable relative to the aft portion between the first and second positions.

In some embodiments, the seat bottom may include first and second bolsters extending between the forward and aft portions. The central portion may be disposed between the first and second bolsters and may be movable relative to the first and second bolsters between the first and second positions.

In some embodiments, the front portion may include a front cushion. In some embodiments, the central portion may include a central cushion that is movable relative to the front cushion between the first and second positions. In some embodiments, the aft portion may include an aft cushion.

In some embodiments, the adjustment mechanism may include a support member supporting the central portion of the seat bottom, a first link pivotably connected to the support member, and a drive member engaging the first link and driving the first link between the first and second positions.

In some embodiments, the adjustment mechanism may include a second link pivotably connected to the support member and a seat-bottom frame. In some embodiments, the first link may be connected to a forward end of the support member, and the second link may be connected to an aft end of the support member.

In some embodiments, the central portion may include a central cushion. The support member may support the central cushion and move the central cushion relative to the seat-bottom frame, the front portion, the rear portion and first and second bolsters of the seat bottom between the first and second positions.

In another form, the present disclosure provides a seat assembly that may include a seatback, a seat bottom and an adjustment mechanism. The seat bottom may include a frame connected to the seatback, first and second bolsters supported by the frame, and a central portion disposed between the first and second bolsters. The adjustment mechanism may support the central portion for movement relative to the first and second bolsters.

In some embodiments, the seat bottom may include an aft portion adjacent to the seatback and a front portion opposite the aft portion. The central portion may be disposed between the front and aft ends.

In some embodiments, the adjustment mechanism may move the central portion relative to the front portion between first and second positions.

In some embodiments, the central portion may be movable relative to the aft portion between the first and second positions.

In some embodiments, the front portion includes a front cushion, the aft portion includes an aft cushion, and the central portion includes a central cushion that may be movable relative to the front cushion between the first and second positions.

In some embodiments, the adjustment mechanism may include a support member supporting the central portion of the seat bottom, a first link pivotably connected to the support member, and a drive member engaging the first link and driving the first link between the first and second positions. In some embodiments, the adjustment mechanism may include a second link pivotably connected to the support member and the frame.

In some embodiments, the first link may be connected to a forward end of the support member, and the second link may be connected to an aft end of the support member.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

When an element or component is referred to as being "on," "engaged to," "connected to," or "coupled to" another element or component, it may be directly on, engaged, connected or coupled to the other element or component, or intervening elements or components may be present. In contrast, when an element or component is referred to as being "directly on," "directly engaged to," "directly connected to," or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

DETAILED DESCRIPTION

Figure 1:
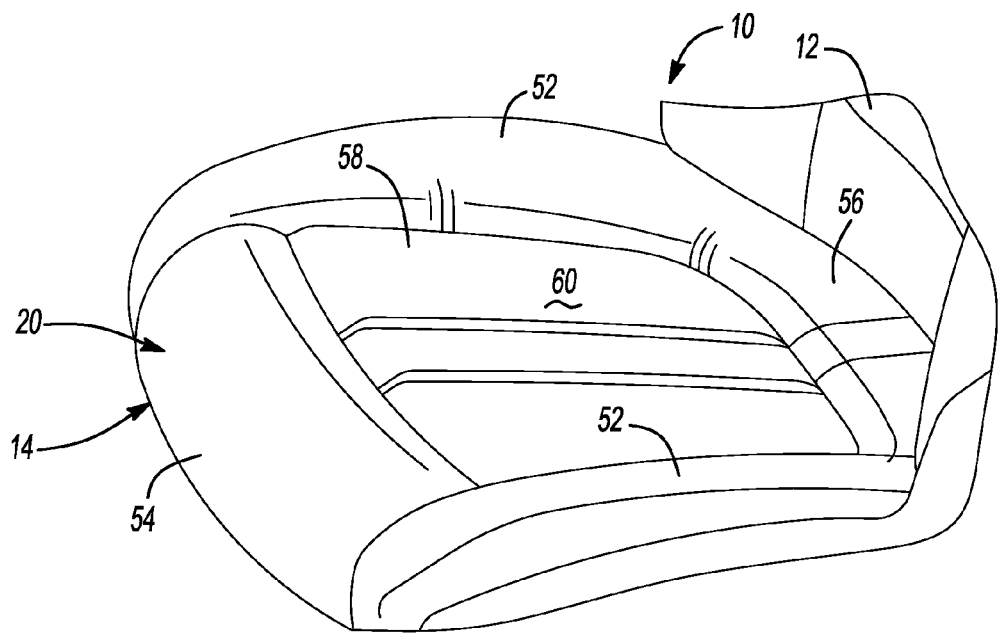
FIG. 1 is a partial perspective view of the seat assembly having a seat-cushion-insert in a first position according to the principles of the present disclosure.
Figure 2:
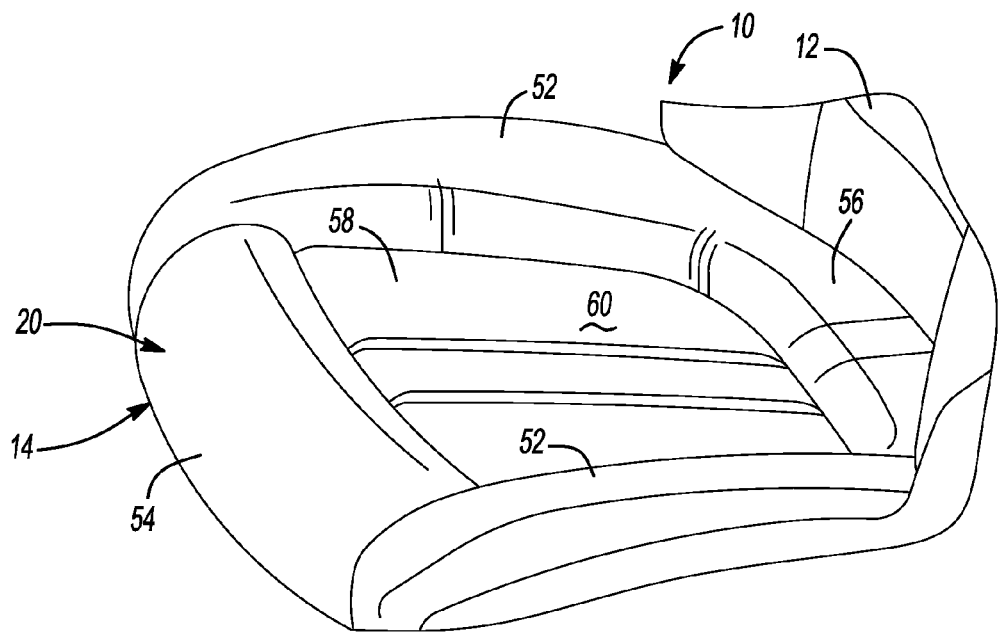
FIG. 2 is a partial perspective view of the seat assembly with the seat-cushion-insert in a second position according to the principles of the present disclosure.

In an exemplary embodiment and with reference to FIGS. 1-6, a seat assembly 10 is provided that may include a seat-back 12 and a seat bottom 14 (FIGS. 1 and 2). The seat bottom 14 may include a seat-bottom frame 16 (partially shown in FIGS. 3 and 4), a cushion-insert-adjustment mechanism 18 and a seat-cushion assembly 20. As will be subsequently described, the cushion-insert-adjustment mechanism 18 may be movable relative to the seat-bottom frame 16 between a first position (shown in FIGS. 3 and 5) and a second position (FIGS. 4 and 6) to move a portion of the seat-cushion assembly 20 between a raised position (shown in FIG. 1) and a lowered position (shown in FIG. 2). The seat assembly 10 may be installed in a vehicle (not shown) such as an automobile, a boat, an aircraft, a train or any other type of vehicle. It will be appreciated, however, that the principles of the present disclosure may be applicable to any type of seat or chair other than a vehicle seat.

Referring now to FIGS. 3-6, the seat-bottom frame 16 may include a pair of generally parallel rail members 21 that cooperate to support the cushion-insert-adjustment mechanism 18 and the seat-cushion assembly 20. The cushion-insert-adjustment mechanism 18 may include a drive unit 22, an axle 24, a first link 26, a second link 27 (FIGS. 3 and 4), an insert-support member 28, and a pair of third links 30 (only one of which is shown in the figures). The drive unit 22 may include a drive gear 32 (FIGS. 5 and 6) driven by an electric motor or a manually operable lever (not shown). The axle 24 may be rotatably supported by the rail members 21 and may be fixedly attached to the first and second links 26, 27.

The first link 26 may include a first end 34, a second end 36 and a central aperture 38 disposed between the first and second ends 34, 36. The first end 34 may include a plurality of gear teeth 40 that engage the drive gear 32 of the drive unit 22. The second end 36 may be pivotably coupled to a first end 41 of the insert-support member 28. The axle 24 may extend through and fixedly engage the central aperture 38. The first link 26 may be welded, press-fit and/or otherwise secured to the axle 24 for rotation with the axle 24 relative to the seat-bottom frame 16.

Figure 3:
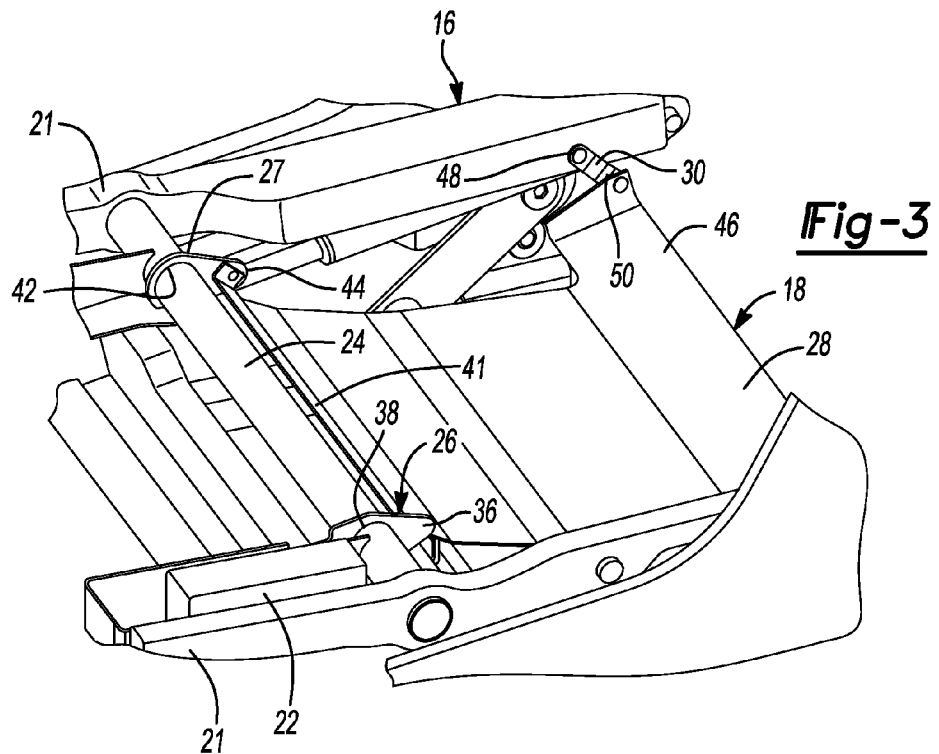
FIG. 3 is a partial perspective view of a seat-bottom frame and a cushion-insert-adjustment mechanism of the seat assembly with the cushion-insert-adjustment mechanism in a first position according to the principles of the present disclosure.
Figure 4:
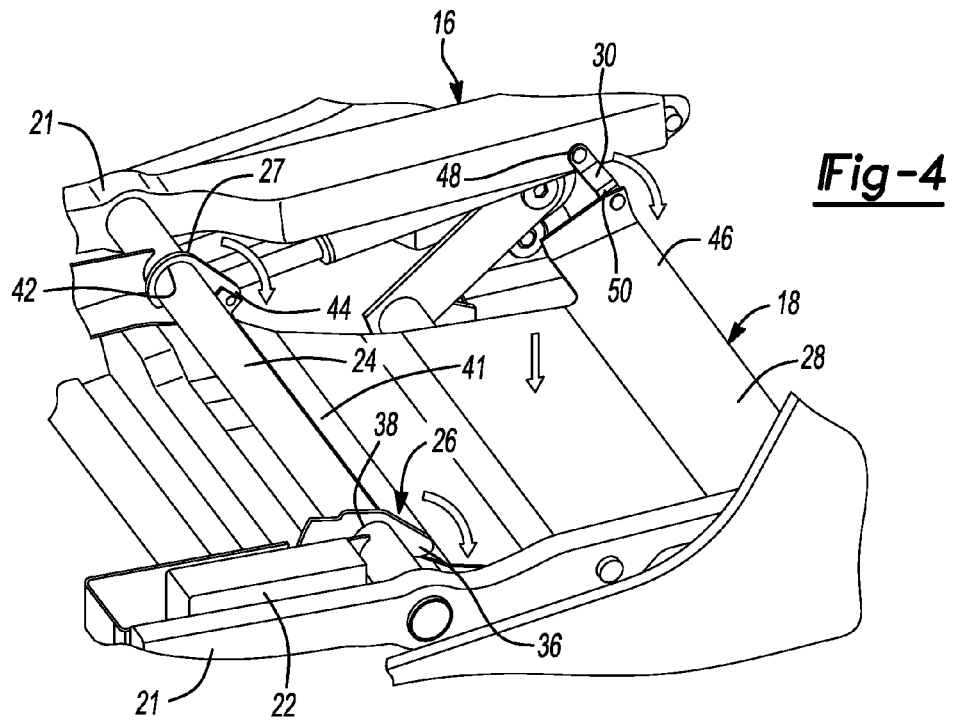
FIG. 4 is a partial perspective view of the seat-bottom frame and the cushion-insert-adjustment mechanism in a second position according to the principles of the present disclosure.

As shown in FIGS. 3 and 4, the second link 27 may be fixedly attached to the axle 24 and rotatable therewith. The second link 27 may include an aperture 42 engaging the axle 24 and a lobe 44 pivotably coupled with the first end 41 of the insert-support member 28.

The insert-support member 28 may be a plate or sheet stamped or otherwise formed from a polymeric or metallic material, for example. The insert-support member 28 may include the first end 41 and a second end 46 and may extend between the rail members 21 of the seat-bottom frame 16. The first end 41 may be coupled with the first and second links 26, 27 for rotation relative thereto, as described above. The second end 46 may be coupled with the third links 30 for rotation relative thereto. Each of the third links 30 may include a first end 48 pivotably coupled to a corresponding rail member 21 and a second end 50 pivotably coupled to the second end 46 of the insert-support member 28.

As shown in FIGS. 1 and 2, the seat-cushion assembly 20 may include a pair of bolsters 52, a forward cushion 54, an aft cushion 56 and a central seat-cushion-insert 58. The bolsters 52 may extend along laterally outer sides of the seat bottom 14 between the forward cushion 54 and the aft cushion 56. The central seat-cushion-insert 58 may be disposed between the bolsters 52 and between the forward and aft cushions 54, 56. The bolsters 52, forward cushion 54, aft cushion 56 and central seat-cushion-insert 58 can be formed from foam and/or any other suitable resiliently compressible materials. In some embodiments, the bolsters 52, forward cushion 54, and aft cushion 56 could form a single, unitary body. In some embodiments, one of more of the bolsters 52, forward cushion 54, and aft cushion 56 could include an air bladder (not shown) instead of or in addition to the foam material that may be selectively inflated and deflated to suit a user's personal preferences. The insert-support member 28 may support the central seat-cushion-insert 58 (shown in FIGS. 1, 2, 5 and 6) and may move the central seat-cushion-insert 58 relative to the seat-bottom frame 16, the bolsters 52, forward cushion 54, and aft cushion 56 between the raised position (FIGS. 1 and 5) and the lowered position (FIGS. 2 and 6). The bolsters 52, forward cushion 54, aft cushion 56 and central seat-cushion-insert 58 may be covered in a leather (natural or synthetic) or cloth upholstery, for example, or any other covering to provide a desired aesthetic appeal.

With reference to FIGS. 1-6, operation of the seat assembly 10 will be described in detail. As described above, the cushion-insert-adjustment mechanism 18 may be movable relative to the seat-bottom frame 16 between a first position (shown in FIGS. 3 and 5) and a second position (FIGS. 4 and 6) to move the central seat-cushion-insert 58 between a raised position (shown in FIGS. 1 and 5) and a lowered position (shown in FIGS. 2 and 6), respectively.

Figure 5:
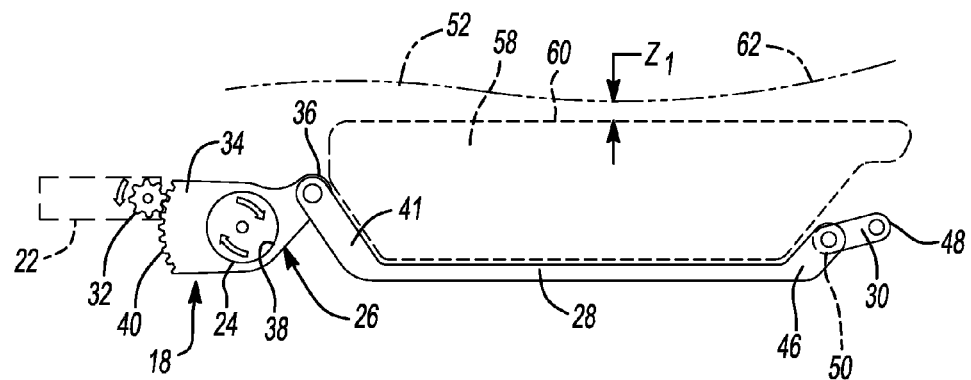
FIG. 5 is a schematic representation of the cushion-insert-adjustment mechanism and seat-cushion-insert in the first position according to the principles of the present disclosure.
Figure 6:
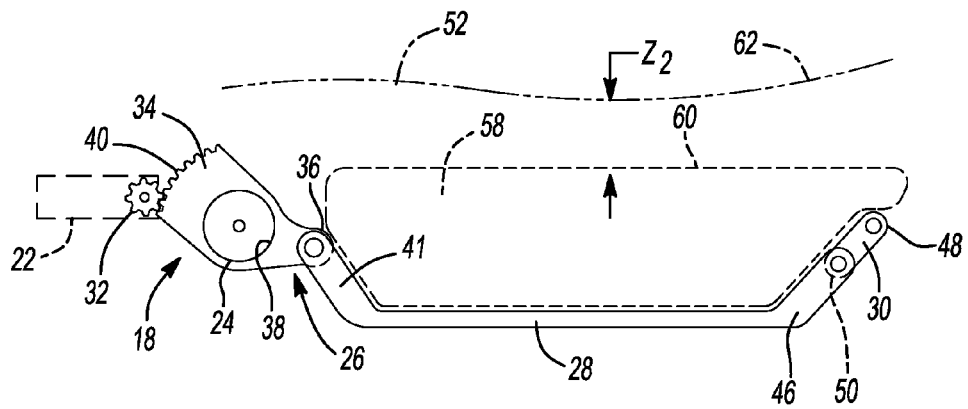
FIG. 6 is a schematic representation of the cushion-insert-adjustment mechanism and seat-cushion-insert in the second position according to the principles of the present disclosure.

To move the cushion-insert-adjustment mechanism 18 from the first position (shown in FIG. 5; corresponding to the raised position of the central seat-cushion-insert 58) to the second position (shown in FIG. 6; corresponding to the lowered position of the central seat-cushion-insert 58), a user may actuate the drive unit 22 to cause rotation of the drive gear 32 in a counterclockwise direction (when viewed from the frame of reference shown in FIG. 5). Such rotation of the drive gear 32 causes corresponding rotation of the first and second links 26, 27 in a clockwise direction (when viewed from the frame of reference shown in FIG. 5) about a longitudinal axis of the axle 24. That is, the first link 26 rotates such that the first end 34 moves upward and the second end 36 moves downward. The downward movement of the second end 36 causes the insert-support member 28 to move downward toward the position shown in FIG. 6. The pair of third links 30 move simultaneously with the first and second links 26, 27 and the insert-support member 28 from the position shown in FIG. 5 to the position shown in FIG. 6.

As shown in FIG. 5, when the cushion-insert-adjustment mechanism 18 is in the first position, an upper surface 60 of the central seat-cushion-insert 58 may be a first vertical distance Z1 from an upper edge 62 of a profile of the bolsters 52. As shown in FIG. 6, when the cushion-insert-adjustment mechanism 18 is in the second position, the upper surface 60 of the central seat-cushion-insert 58 may be a second vertical distance Z2 from the upper edge 62 of the profile of the bolsters 52. The second vertical distance Z2 is greater than the first vertical distance Z1. In an exemplary embodiment, the difference between the first and second vertical distances Z1, Z2 may be about twenty millimeters. It will be appreciated from the present disclosure that the cushion-insert-adjustment mechanism 18 could be configured to provide for any desired distance less than or greater than twenty millimeters between the first and second vertical distances Z1, Z2.

A user may customize the feel and comfort of the seat assembly 10 by moving the central seat-cushion-insert 58 between the raised and lowered positions in the manner described above. Lowering the central seat-cushion-insert 58 relative to the bolsters 52 and the forward cushion 54 may increase an amount of thigh support that the forward cushion 54 provides for the user, which may provide more comfort for some users. Conversely, raising the central seat-cushion-insert 58 relative to the bolsters 52 and the forward cushion 54 may decrease the amount of thigh support that the forward cushion 54 provides for the user, which may provide more comfort for some users.

It will be appreciated from the present disclosure that the cushion-insert-adjustment mechanism 18 could be moved to any position between the first and second positions described above to adjust the position of the central seat cushion insert 58 according to a user's personal preferences.

It will be appreciated from the present disclosure that a vehicle in which the seat assembly 10 is installed could include a seat-position memory and recall system in which a position and configuration of the seat assembly 10 can be stored in an electronic memory device so that a user can restore all of his or her preferred seat settings with a push-button or touch-screen interface. Such a seat-position memory system could also store and recall a preferred position of the cushion-insert-adjustment mechanism 18.

While the seat assembly 10 is described above and shown in the figures as including the cushion-insert-adjustment mechanism 18 to raise and lower the central seat-cushion-insert 58, it will be appreciated from this disclosure that the central seat-cushion-insert 58 could be raised and lowered relative to the bolsters 52, forward cushion 54 and aft cushion 56 by any suitable mechanism. Therefore, the principles of the present disclosure are not limited to the particular mechanism and structures described above and shown in the figures.

What is claimed is:

1. A seat assembly comprising:
   a seatback;
   a seat bottom having an aft portion adjacent to the seatback, a front portion opposite the aft portion, and a central portion disposed between the front and aft ends; and
   an adjustment mechanism including a support plate supporting the central portion and translating relative to the front and aft ends to move the central portion relative to the front portion between first and second positions, the support plate having the same shape in the first and second positions.

2. The seat assembly of claim 1, wherein the central portion is movable relative to the aft portion between the first and second positions.

3. The seat assembly of claim 1, wherein the seat bottom includes first and second bolsters extending between the forward and aft portions, the central portion being disposed between the first and second bolsters and movable relative to the first and second bolsters between the first and second positions.

4. The seat assembly of claim 1, wherein the front portion includes a front cushion.

5. The seat assembly of claim 4, wherein the central portion includes a central cushion that is movable relative to the front cushion between the first and second positions.

6. The seat assembly of claim 5, wherein the aft portion includes an aft cushion.

7. The seat assembly of claim 1, wherein the adjustment mechanism includes a first link pivotably connected to the support plate, and a drive gear engaging the first link and driving the first link between the first and second positions.

8. The seat assembly of claim 7, wherein the adjustment mechanism includes a second link pivotably connected to the support member and a seat-bottom frame.

9. The seat assembly of claim 8, wherein the first link includes a first end and a second end, the first end having a plurality of gear teeth meshingly engaged with the drive gear, the second end is rotatably connected to a forward end of the support plate, the first link is rotatable about a rotational axis disposed between the first and second ends, and wherein the second link is connected to an aft end of the support member.

10. The seat assembly of claim 9, wherein the central portion includes a central cushion, and wherein the support plate supports the central cushion and moves the central cushion relative to the seat-bottom frame, the front portion, the rear portion a first bolster of the seat bottom and a second bolster of the seat bottom between the first and second positions.

11. A seat assembly comprising:
    a seatback;
    a seat bottom having a frame connected to the seatback, first and second bolsters supported by the frame, and a central portion disposed between the first and second bolsters; and
    an adjustment mechanism including a support plate supporting the central portion and translating relative to the first and second bolsters to move the central portion relative to the first and second bolsters.

12. The seat assembly of claim 11, wherein the seat bottom includes an aft portion adjacent to the seatback and a front portion opposite the aft portion, the central portion being disposed between the front and aft ends.

13. The seat assembly of claim 12, wherein the adjustment mechanism moves the central portion relative to the front portion between first and second positions.

14. The seat assembly of claim 13, wherein the central portion is movable relative to the aft portion between the first and second positions.

15. The seat assembly of claim 12, wherein the front portion includes a front cushion.

16. The seat assembly of claim 15, wherein the central portion includes a central cushion that is movable relative to the front cushion between the first and second positions.

17. The seat assembly of claim 16, wherein the aft portion includes an aft cushion.

18. The seat assembly of claim 11, wherein the adjustment mechanism includes a first link pivotably connected to the support plate, and a drive gear engaging the first link and driving the first link between the first and second positions.

19. The seat assembly of claim 18, wherein the adjustment mechanism includes a second link pivotably connected to the support plate and the frame.

20. The seat assembly of claim 19, wherein the first link includes a first end and a second end, the first end having a plurality of gear teeth meshingly engaged with the drive gear, the second end is rotatably connected to a forward end of the support plate, the first link is rotatable about a rotational axis disposed between the first and second ends, and wherein the second link is connected to an aft end of the support member.

\* \* \* \* \*